March 20, 1962   N. H. McLAREN ET AL   3,026,083
BUTTERFLY VALVES
Filed Dec. 31, 1959
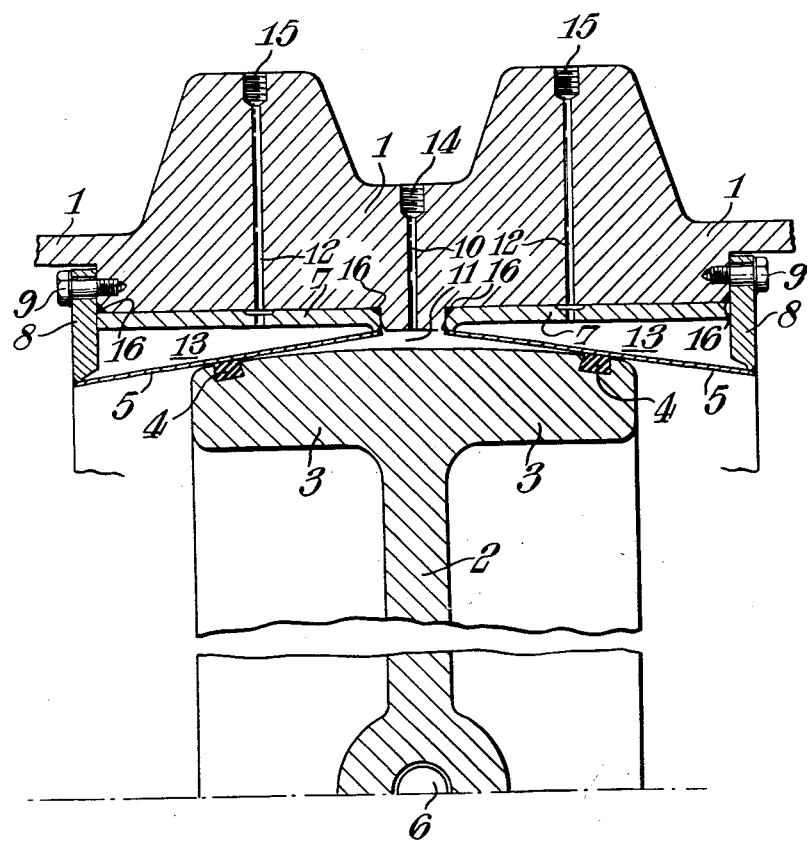
INVENTOR
NORMAN HAROLD MCLAREN
WILLIAM THOMSON MITCHELL
BY Larson and Taylor though a nuclear reactor and is therefore likely to be

3,026,083
BUTTERFLY VALVES

Norman Harold McLaren and William Thomson Mitchell, Culcheth, near Warrington, England, assignors to United Kingdom Atomic Energy Authority, London, England
Filed Dec. 31, 1959, Ser. No. 863,352
4 Claims. (Cl. 251—173)

This invention relates to butterfly valves.

Butterfly valves are generally used to control and shut-off the flow of fluid along a pipe when a small degree of leak past the butterfly vane can be tolerated in the shut-off position. Some proposals have been made for improving the sealing of butterfly valves, so that they can be used as leak-free closure valves on large pipes. One such proposal includes mechanical devices for moving the butterfly vane bodily along the direction of fluid flow when the vane is in the position transverse to the direction of fluid flow to move it against and away from a valve seating.

In another proposal the butterfly vane carries a peripheral sealing member adapted to be expanded by the pressure of fluid flowing through the valve, a sealing contact being effected with a seating provided by the body part.

According to the present invention a butterfly valve comprises a tubular body part and a pivoted disc, characterised in that means are provided to effect a pair of spaced annular seals between the periphery of the disc and the body part and that the axis of the pivot of the disc lies in the space between said seals.

By way of example, a butterfly valve according to the invention will now be described with reference to the single FIGURE of the drawing accompanying the provisional specification which is a longitudinal half-section.

Referring to the drawing, a butterfly valve (shown in the shutoff position) comprises a tubular body part 1 and a pivoted valve closure disc 2, the disc 2 having a peripheral portion 3 with sealing rings 4 adapted to effect a seal with the body part 1 over a pair of spaced annular diaphragms 5 of frustroconical form and the disc 2 being mounted on a pivot shaft 6 which lies between the diaphragms 5.

Each of the diaphragms 5 is welded at one end to a backing ring 7 and is welded at the other end to a ring plate 8 secured to the body part 1 by bolts 9, sealing rings 16 being provided. The wall of the body part 1 is drilled to provide a passageway 10 to provide access to a space 11 which is bounded by the body 1, the seals comprising diaphragms 5 and rings 4, and the peripheral portion 3 of the disc 2, and is also drilled to provide passageways 12 to allow pressurisation of spaces 13 between the diaphragms 5 and the rings 7. The passageways 10, 12 have screw-threaded sockets 14, 15 respectively which are normally plugged when the butterfly valve is open.

In operation, the butterfly valve is brought from an open position to the shut-off position by rotation of the disc 2 via the shaft 6. The seal between the rings 4 and the diaphragms 5 is effected by pressurising the spaces 13 via the passageways 12, the sockets 15 being unplugged and coupled with a pressurising source. In this way the diaphragms 5 are pressed into sealing contact with the rings 4. The passageway 10 provides for external access to the space 11 for leakage testing. The parts 5, 7, 8 are replaceable as units, each unit being removable by unscrewing the bolts 9. The passageway 10 can also provide for leak prevention across the disc 2 when the valve is in the closed position. Typically, if the disc 2 is used for holding back a coolant which has passed through a nuclear reactor and is therefore likely to be contaminated with radioactive materials, pure clean coolant can be fed along the passageway 10 to prevent outleakage of contaminated coolant. An acceptably small inleakage of pure coolant will then occur. Alternatively, the passageway 10 may be connected to an evacuating system so that any leakage between rings 4 and diaphragm 5 can be removed and, if necessary, stored for eventual disposal.

The provision of the pair of spaced diaphragms 5 with the disc pivoted about an axis lying between the diaphragms 5 gives a fully balanced valve. A single seal would necessitate a skew shaft arrangement in order that the pivot shaft should not pass through the seal, and such an arrangement would give rise to high offset loads in the body part 1.

What we claim is:

1. A butterfly valve comprising a tubular body, first and second annular sealing diaphragms axially spaced apart inside said body, each diaphragm being sealed at its edges to the body to form an annular space bounded by the body and the diaphragm, a rotatable shaft mounted inside said body between said diaphragms, a valve closure disc mounted on said shaft, first and second sealing rings sealed to the periphery of the disc and spaced apart on opposite sides of said shaft for respective co-operation with said first and second diaphragms, and passageways defined in the valve for applying fluid pressure to seal together said diaphragms and their respective sealing rings.

2. A butterfly valve comprising a tubular body, first and second annular sealing diaphragms axially spaced apart inside said body, each of said diaphragms being sealed at its edges to the body to form an annular space bounded by the body and the diaphragm, a rotatable shaft mounted inside said body between said diaphragms, a valve closure disc mounted on said shaft, first and second sealing rings sealed to the periphery of said disc and spaced apart on opposite sides of said shaft for respective co-operation with said first and second diaphragms, and said body defining passageways communicating with said annular spaces for applying fluid pressure to seal said first diaphragm to said first sealing ring and said second diaphragm to said second sealing ring.

3. A butterfly valve comprising a tubular body, first and second annular sealing diaphragms axially spaced apart inside said body, a passageway defined through the valve and communicating with the inside of the body between said first and second diaphragms, each diaphragm being sealed at its edges to the body to form an annular space bounded by the body and the diaphragm, a rotatable shaft mounted inside said body between said diaphragms, a valve closure disc mounted on said shaft, first and second sealing rings sealed to the periphery of the disc and spaced apart on opposite sides of said shaft for respective co-operation with said first and second diaphragms, and passageways defined in the valve for applying fluid pressure to seal together said diaphragms and their respective sealing rings.

4. A butterfly valve comprising a tubular body, first and second annular sealing diaphragms axially spaced apart inside said body, said body defining a passageway through the body and communicating with the inside of the body between said first and second diaphragms, each of said diaphragms being sealed at its edges to the body to form an annular space bounded by the body and the diaphragm, a rotatable shaft mounted inside said body between said diaphragms, a valve closure disc mounted on said shaft, first and second sealing rings sealed to the periphery of said disc and spaced apart on opposite sides of said shaft for respective co-operation with said first and second diaphragms, and said body defining passageways communicating with said annular spaces for applying fluid pressure to seal said first diaphragm to said first sealing ring and said second diaphragm to said second sealing ring.

References Cited in the file of this patent
UNITED STATES PATENTS

| | | |
|---|---|---|
| 1,990,309 | Phillips | Feb. 5, 1935 |
| 2,863,630 | Broz | Dec. 9, 1958 |